United States Patent [19]
Sato

[11] Patent Number: 6,163,652
[45] Date of Patent: Dec. 19, 2000

[54] CAMERA

[75] Inventor: Yoichi Sato, Yokosuka, Japan

[73] Assignee: Canon Kabushiki Kaisha, Tokyo, Japan

[21] Appl. No.: 09/382,940

[22] Filed: Aug. 25, 1999

[30]  Foreign Application Priority Data

Aug. 31, 1998 [JP] Japan .................................. 10-259162

[51] Int. Cl.$^7$ .............................. G03B 7/08; G03B 13/36
[52] U.S. Cl. ............................................ 396/121; 396/234
[58] Field of Search .................................... 396/121, 122, 396/123, 233, 234

[56]  References Cited

U.S. PATENT DOCUMENTS

| 4,974,007 | 11/1990 | Yoshida | 396/121 |
| 5,422,700 | 6/1995 | Suda et al. | 396/121 |
| 5,749,000 | 5/1998 | Narisawa | 396/121 |
| 5,930,533 | 7/1999 | Yamamoto | 396/121 |
| 6,035,139 | 3/2000 | Nakamura | 396/121 |

*Primary Examiner*—W. B. Perkey
*Attorney, Agent, or Firm*—Robin, Blecker & Daley

[57]  ABSTRACT

A camera includes a focus detecting part capable of performing a focus detecting operation on each of a plurality of focusing areas, a light measuring part capable of performing a light measuring operation on each of a plurality of light measuring areas, a setting part arranged to set selectable focusing areas to be selectable from among the plurality of focusing areas, and a varying part arranged to vary selectable light measuring areas according to the selectable focusing areas set by the setting part.

17 Claims, 13 Drawing Sheets

F I G. 9(a)
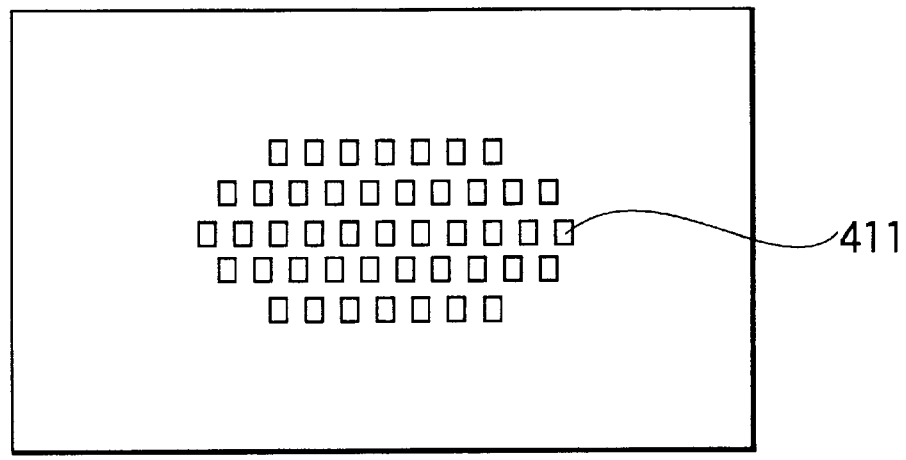
F I G. 9(b)
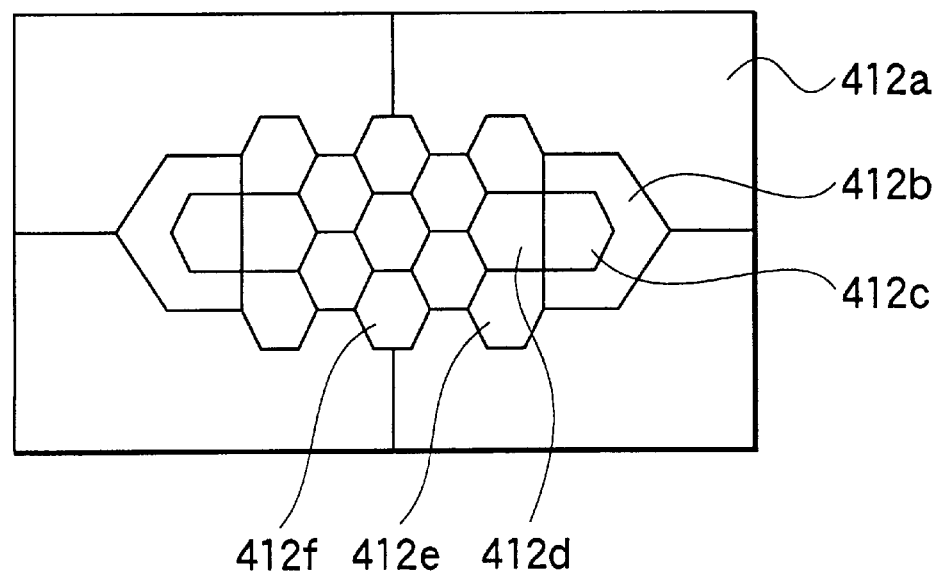

CAMERA

BACKGROUND OF THE INVENTION

1. Field of the Invention

The present invention relates to an improvement on a camera having a plurality of focus adjusting areas and a plurality of light measuring areas or a plurality of light measuring modes.

2. Description of Related Art

The recent advancement of technology has caused a tendency to increase the number of automatic focusing (AF) areas (hereinafter referred to as AF points) which are arranged within the visual field of a viewfinder for detecting focus information. The increase of the AF points is causing the number of light measuring areas also to increase. The increase of the light measuring areas causes a decrease of area per cell of the light measuring areas. As a result, a method for measuring light called "spot light measurement" by which the light of only a several percent of area of an image plane within a viewfinder is measured has become feasible not only for a central part of the image plane but also for a peripheral part of the image plane.

BRIEF SUMMARY OF THE INVENTION

In accordance with one aspect of the invention, there is provided a camera having focus detecting means capable of performing a focus detecting operation on each of a plurality of focusing areas and light measuring means capable of performing a light measuring operation on each of a plurality of light measuring areas, in which focusing areas selectable from among the plurality of focusing areas are set, and light measuring areas selectable from among the plurality of light measuring areas are varied according to the set selectable focusing areas.

The above and other aspects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 9(a) and 9(b) are diagrams showing selectable AF points and light measuring areas of a camera according to a second embodiment of the invention.

DETAILED DESCRIPTION OF THE INVENTION

Hereinafter, preferred embodiments of the invention will be described in detail with reference to the drawings.

Figure 1A:
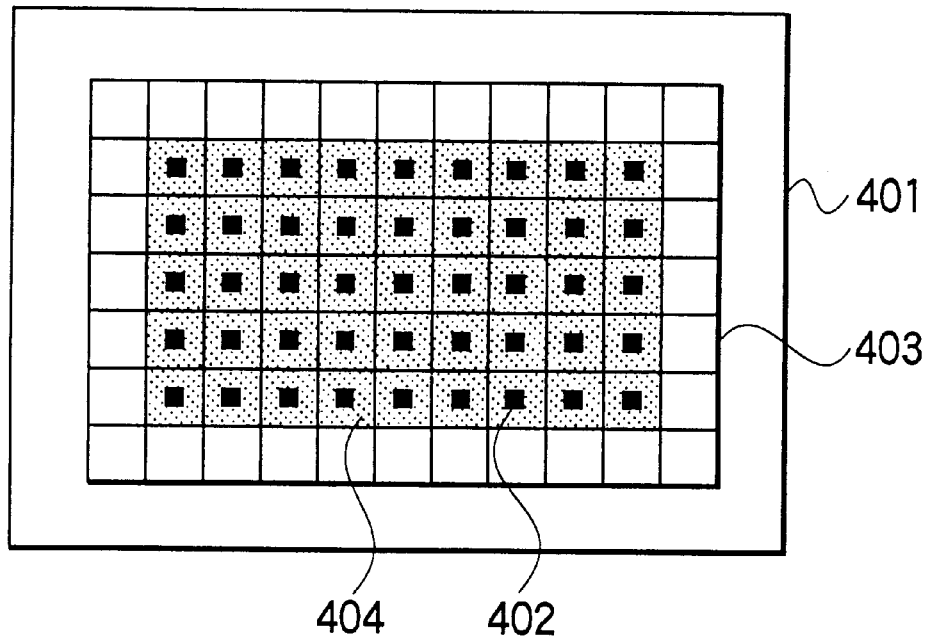
FIGS. 1(a) and 1(b) are diagrams showing selectable AF points and light measuring areas of a camera according to a first embodiment of the invention.
Figure 1B:
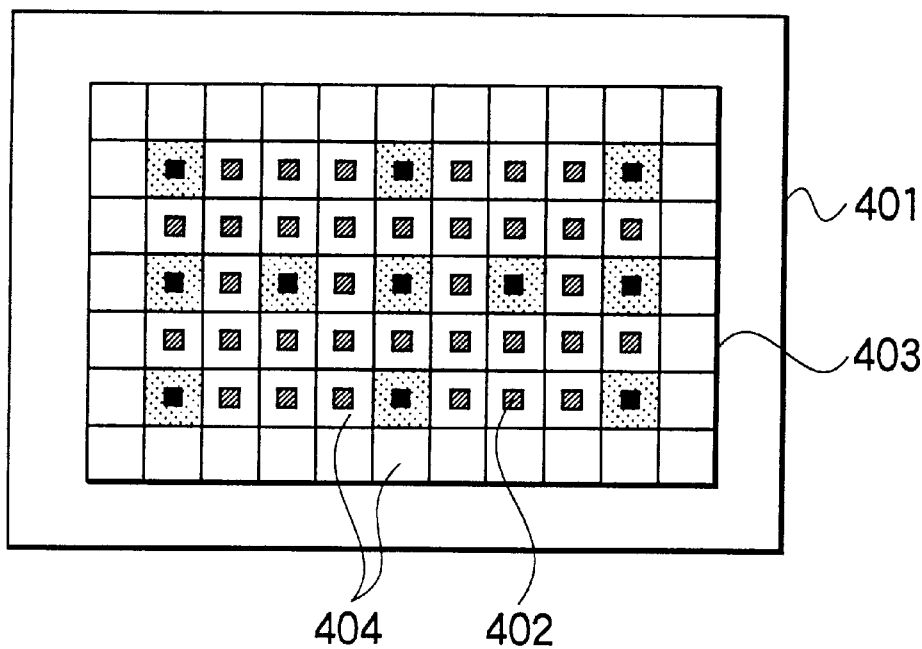

FIGS. 1(a) and 1(b) show AF points and light measuring areas within the visual field of the viewfinder of a camera according to a first embodiment of the invention.

The illustrations of FIGS. 1(a) and 1(b) include a viewfinder visual field 401, AF points 402, which are the smallest square parts indicated in black and with hatching, a light measurable range 403 within which light is measurable by a light measuring sensor, and areas 404 each of which corresponds to one cell arranged by dividing the light measuring sensor to individually permit a light measuring action. The areas 404 are square in shape including the AF points 402 respectively therein and are shown either in white or in gray in FIGS. 1(a) and 1(b). Hereinafter, the areas 404 are called "divided light measuring areas".

As shown in FIGS. 1(a) and 1(b), the divided light measuring areas 404 are a total of 77 areas arranged in 7 rows and 11 columns. The AF points 402 are a total of 45 points arranged in 5 rows and 9 columns. Among the divided light measuring areas 404, the areas shown in gray indicate areas for which spot-light measurement is possible.

FIG. 1(a) shows a mode in which any one of 45 AF points 402 can be selected by the user of the camera. In this mode, the user is allowed to select one of the 45 AF points. The AF point thus selected is shown in a black state which represents a state of being lighted up by an LCD in actuality. Spot light measurement is possible for every one of the 45 divided light measuring areas 404 which are shown in gray and correlated to the AF points 402. In the case of the spot light measurement, only the divided light measuring area 404 that corresponds to an AF point selected is used when one of the 45 AF points shown in black is finally selected by the user.

FIG. 1(b) shows another mode in which any one of 11 AF points 402 can be selected by the user. In that mode, the user is allowed to select one of 11 selectable AF points which are shown in black, while the points shown with hatching are not selectable. Spot light measurement is possible for every one of 11 divided light measuring areas 404 which are shown in gray and correlated to the 11 AF points 402. In this case, only a divided light measuring area 404 corresponding to a desired AF point is automatically used as a spot light measuring area when the user selects this AF point from among the 11 AF points.

Figure 2:
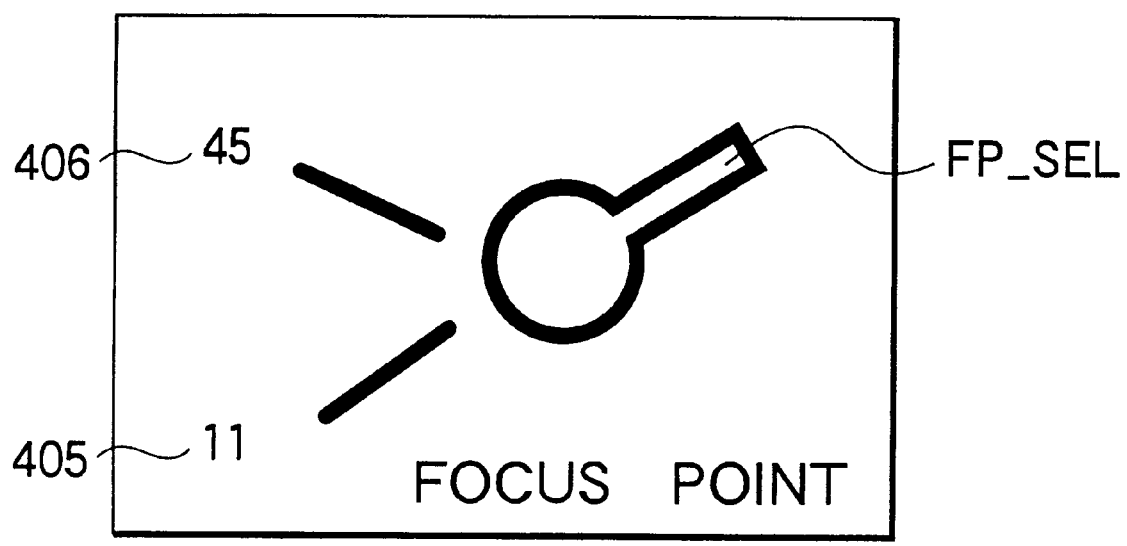
FIG. 2 is a top view of an AF point selecting mode switch of the camera according to each embodiment of the invention.

FIG. 2 is an enlarged view of an AF point selecting mode switch FP_SEL provided for selecting one of AF point selecting modes. The mode of selecting 11 points as selectable AF points shown in FIG. 1(b) can be selected by adjusting the position of the switch FP-SEL to an index 405 marked "11". The mode of selecting 45 points as selectable AF points as shown in FIG. 1(a) can be selected by adjusting the position of the switch FP-SEL to an index 406 marked "45".

Figure 3:
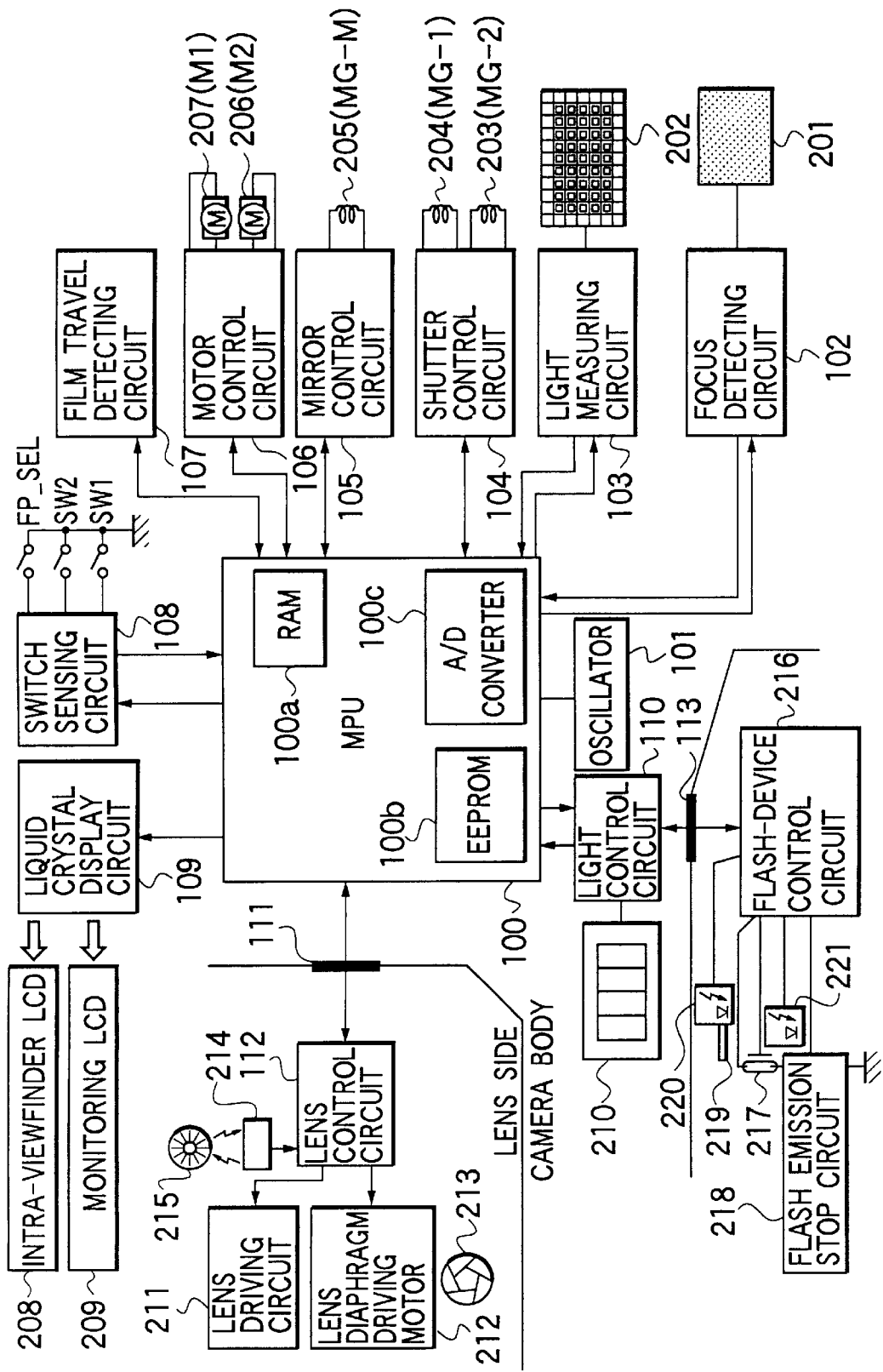
FIG. 3 is a block diagram showing the electrical circuit arrangement of the camera arranged according to each embodiment of the invention.

FIG. 3 is a block diagram showing the electrical circuit arrangement of essential parts of the above-stated camera. Referring to FIG. 3, an MPU 100 is arranged to control various actions of the camera. The MPU 100 includes a RAM 100a, an EEPROM 100b which is a nonvolatile memory, and an A/D converter 100c which converts the analog values of measured light, focus information, etc., into digital values. An oscillator 101 is arranged to generate an oscillation frequency for the operation of the MPU 100. A focus detecting circuit 102 is arranged to be capable of detecting focus information on each of the 45 AF points. An AF sensor 201 has sensor parts arranged in pairs with the total of 45 AF points which are arranged in 5 rows and 9 columns as shown in black in FIG. 1(a).

A light measuring circuit 103 is provided with a light measuring sensor 202. The light measuring sensor 202 is composed of cells (sensor parts) which are arranged to correspond to the 77 divided light measuring areas 404 arranged in 7 rows and 11 columns as shown in FIG. 1(a). A shutter control circuit 104 is arranged to act in accordance with control signals from the MPU 100 to allow a leading shutter blade (not shown) to travel by causing a current to flow to a coil 204 (MG-1) and, after the lapse of a predetermined length of time, to allow a trailing shutter blade to travel by causing a current to flow to a coil 203 (MG-2). A mirror control circuit 105 is arranged to cause a current to flow to a coil 205 (MG-M) in accordance with an instruction from the MPU 100 to move a mirror up or down. A motor control circuit 106 is arranged to drive a shutter charging motor 206 (M1) and a film transport motor 207 (M2) in accordance with instructions coming from the MPU 100.

A film travel detecting circuit 107 is arranged to detect the travel of a film by applying infrared rays to the film while the film is in process of transport. A switch sensing circuit 108 is arranged to sense the stakes of the various operation members and input switches of the camera. For example, the switch sensing circuit 108 senses the states of a switch SW1 which is provided for light measurement and automatic focusing, a switch SW2 which is a release switch, and the AF point selecting mode switch FP_SEL shown in FIG. 2 which is provided for selecting the numbers of selectable AF points. A liquid crystal display circuit 109 is arranged to light up and control an intra-viewfinder LCD 208 and a monitoring LCD 209 which is an external liquid crystal display. The intra-viewfinder LCD 208 has LCD points at the respective positions corresponding to the 45 AF points shown in FIGS. 1(a) and 1(b), and the liquid crystal display circuit 109 lights up a LCD point corresponding to the selected AF point and puts off the LCD points corresponding to the AF points not selected.

A light control circuit 110 is arranged to control light emission of a flash device and to control bringing the light emission to a stop according to the output of a light control sensor 210. A lens contact part 111 is composed of terminals arranged to supply, from on the side of camera body to a lens unit, power for lens driving and for stopping down a diaphragm of the lens and also to send control signals from the camera body to the lens unit.

The lens unit includes a lens control circuit 112. The lens control circuit 112 is arranged to receive the control signals from the MPU 100 disposed on the camera body side to control a lens driving motor 211 and a lens diaphragm driving motor 212 and also to receive a signal from a photo-interrupter 214. The photo-interrupter 214 is arranged to output and send to the lens control circuit 112 the signal by receiving transmitted light coming through a pulse plate 215 interlocked with the driving of the lens. A diaphragm 213 is arranged to be driven by the lens diaphragm driving motor 212.

A flash-device control contact 113 is arranged as communication terminals between the camera body and an external flash device. A flash-device control circuit 216 is arranged within the external flash device to cause a xenon lamp 217 to emit light and to control a light emission stop circuit 218 according to the output of the light control circuit 110 which is disposed on the side of the camera body. A glass fiber part 219 is arranged to lead light of the xenon lamp 217 to a photodiode 220. The photodiode 220 is arranged to detect a preliminary light emission output for control over the amount of light emission from the flash device. Another photodiode 221 is arranged to directly monitor outputs of the xenon lamp 217 and to be used for controlling the flat light emission by monitoring its output obtained at the time of preliminary light emission.

Figure 4:
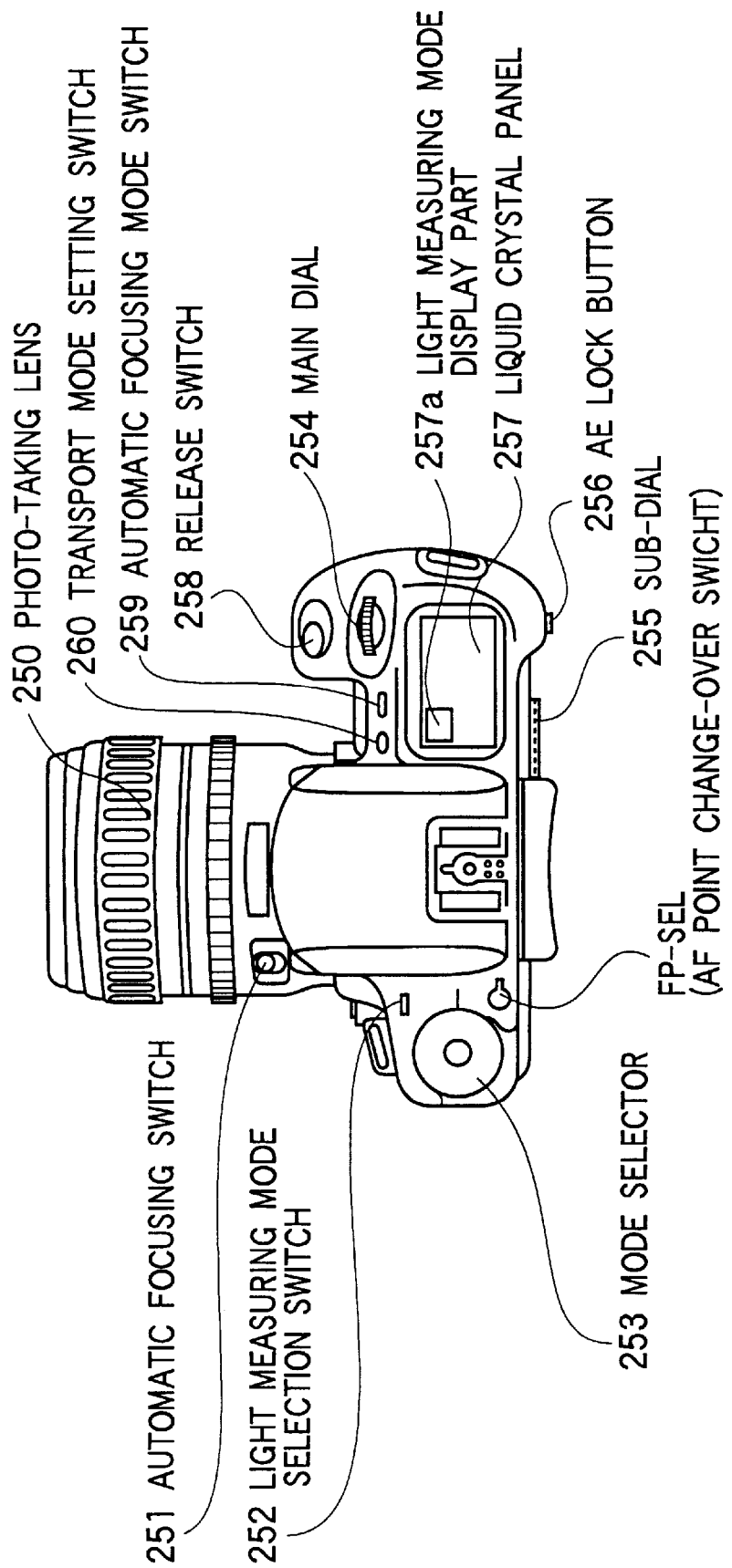
FIG. 4 is a top view of the camera according to each embodiment of the invention.

FIG. 4 is a top view of the camera arranged as described above. The camera is provided with operation members as shown in FIG. 4. Signals indicating states of these operation members are arranged to be sent to the switch sensing circuit 108 which is shown in FIG. 3.

Referring to FIG. 4, an automatic focusing switch 251 is arranged on a photo-taking lens 250 to allow the user of the camera to decide whether a shot is to be taken by automatic focusing or by manual focusing. A light measuring mode selection switch 252 is arranged to permit selection of a light measuring mode from among the various light measuring modes including an evaluative light measuring mode, an averaging light measuring mode, a spot light measuring mode and a partial light measuring mode. A mode selector 253 is arranged to permit the user to set the camera into one of photo-taking modes, such as a shutter priority AE mode or an aperture priority AE mode.

Figure 8:
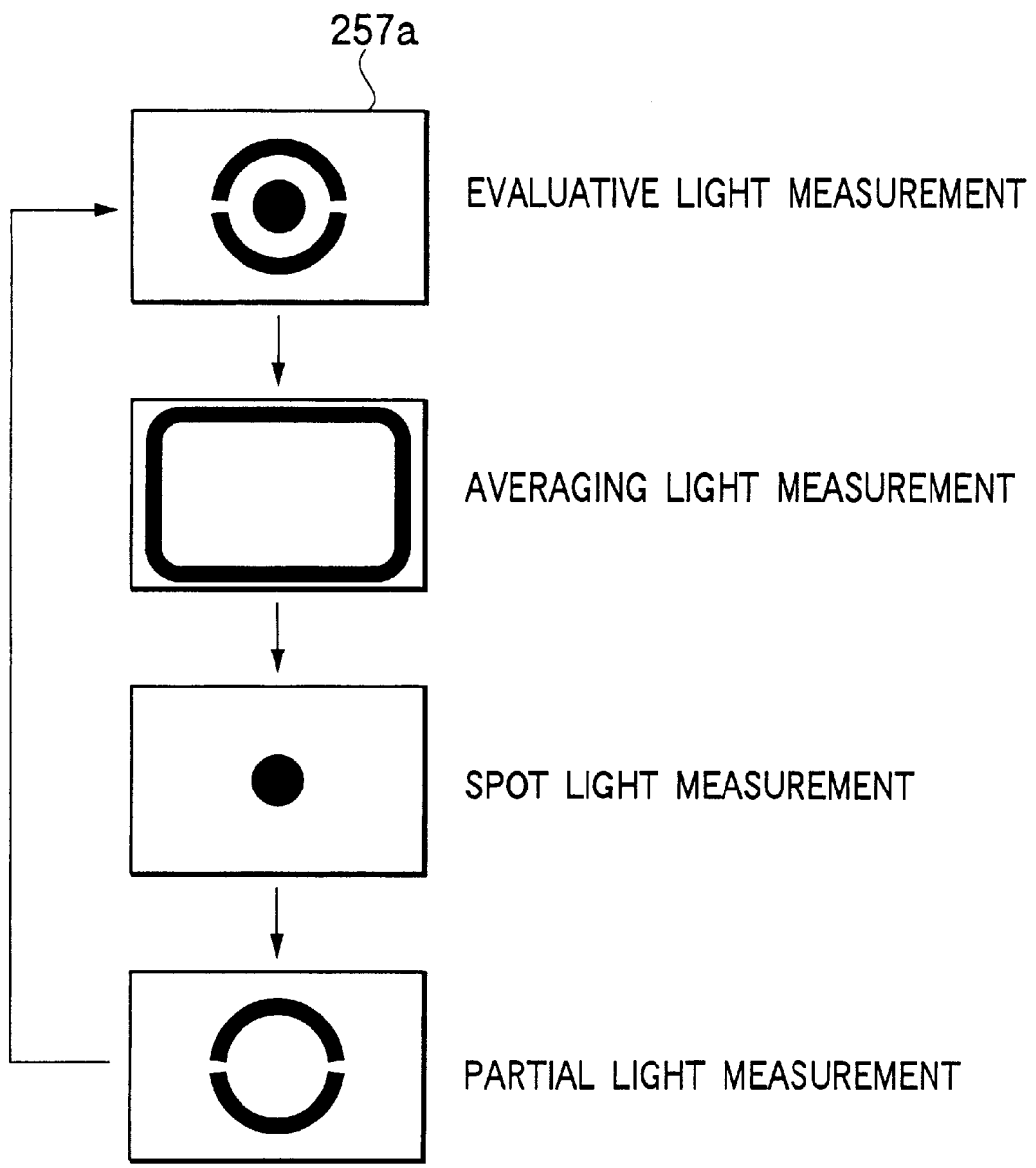
FIG. 8 is a diagram showing a selecting sequence of light measuring modes and display states of the light measuring modes of the camera according to each embodiment of the invention.

The AF point selecting mode switch FP_SEL is also arranged, as shown in FIG. 2, to be used in selecting the number of selectable AF points from among the 45 AF points and the 11 AF points. A main dial 254 and a sub-dial 255 are arranged to permit setting a shutter speed, an aperture value and also selecting one of the selectable AF points as desired. An AE lock button 256 is arranged to fix a measured light value at a desired value when it is pushed. Further, an FELK action can be performed by pushing this button 256 in using the flash device. A liquid crystal panel 257 is arranged to let the user know the setting values of the camera. The panel 257 includes a light measuring mode display part 257a for making a light measuring mode display, which varies, as shown in FIG. 8, according to a selecting operation performed on the above-stated light measuring mode selection switch 252.

A release (button) switch 258 is arranged to turn on the switch SW1 shown in FIG. 3 when it is pushed halfway down. With the switch SW1 turned on, light measuring and AF actions begin. When the release switch 258 is fully pushed down, the switch SW2 shown in FIG. 3 is turned on to cause a (shutter) release action to begin. An automatic focusing mode switch 259 is arranged to select either a mode in which the lens position is fixed at an in-focus position once an in-focus position is obtained or another mode in which the automatic focusing action continues until a shutter operation comes to an end with the object of shooting assumed to be a moving object. A transport mode setting switch 260 is arranged to select either a film transport mode in which the film is to be continuously wound up or another film transport mode in which the film winding extent is fixed to an extent corresponding to one frame portion of the film.

Figure 5:
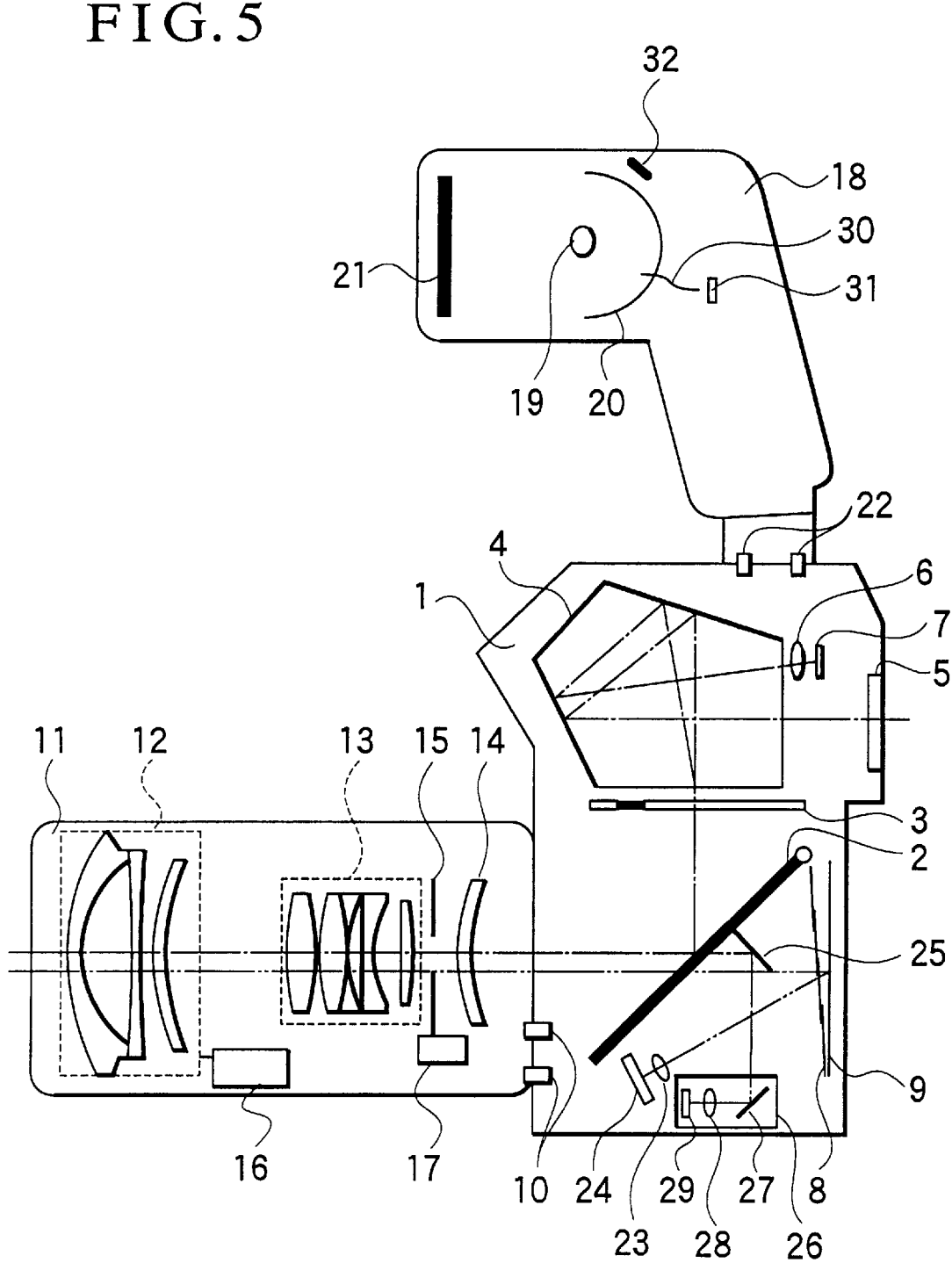
FIG. 5 is a sectional view showing mainly the optical arrangement of the camera and the flash device according to each embodiment of the invention.

FIG. 5 shows mainly the optical arrangement of the camera and an external flash device which is mounted as an accessory on the camera.

In FIG. 5, reference numeral 1 denotes the camera body. The camera body 1 includes therein various optical parts which will be described below, mechanical parts which are not shown, electrical elements which are shown in FIG. 3, a photosensitive member, etc. Pictures can be taken by using them. Referring to FIG. 5, a main mirror 2 is arranged to be either obliquely set in a photo-taking optical path or retracted from the optical path according to whether the camera is in an object observing state or in a photo-taking state. Further, the main mirror 2 is a half mirror and is arranged to allow about one half of a light flux coming from an object of shooting (not shown) to pass therethrough even when the mirror 2 is in the obliquely set state as shown in FIG. 5.

A focusing screen 3 is set on a prescribed image forming plane of lens groups 12, 13 and 14. A pentagonal roof prism 4 is arranged to change the optical path of a viewfinder. The viewfinder is arranged to enable the user of the camera to observe a photo-taking image plane by viewing the focusing screen 3 through a window 5. An image forming lens 6 and a multi-divided light measuring sensor 7 are arranged in combination for measuring the luminance of the object as obtained within the observing image plane. The image forming lens 6 is arranged to have the focusing screen 3 conjugate to the light measuring sensor 7 (corresponding to the light measuring sensor 202 shown in FIG. 3) through a reflection optical path obtained within the pentagonal roof prism 4. The illustration of FIG. 5 includes a shutter 8 and a photosensitive member 9 which is a silver-halide film or the like.

An image forming lens 23 and a light control sensor 24 are arranged in combination for measuring light reflected by the surface of the film at the time of an exposure. Light emission made from the flash device in making an exposure is measured by means of the light control sensor 24 (corresponding to the light control sensor 210 shown in FIG. 3). The amount of light emission from the flash device is controlled by bringing the light emission to a stop when the amount of light emission is decided to have reached a predetermined amount through the light measurement made by the light control sensor 24. A sub-mirror 25 is arranged to lead a light flux from the object to a focus detecting unit 26 by bending the light flux downward as viewed FIG. 5.

The focus detecting unit 26 includes a secondary image forming mirror 27, a secondary image forming lens 28, a focus detecting line sensor 29 (corresponding to the AF sensor 201 shown in FIG. 3), etc. A focus detecting optical system is formed by the secondary image forming mirror 27 and the secondary image forming lens 28. The secondary image forming plane of the photo-taking optical system is obtained on the focus detecting line sensor 29. The focus detecting unit 26 is arranged to detect the focused state of the object obtained at each of the 45 points (AF points 402 shown FIG. 1(a)) within the photo-taking image plane for an automatic focus detecting device which controls the focus adjusting mechanism of the photo-taking lens.

In FIG. 5, lens contacts 10 correspond to the lens contacts 111 shown in FIG. 3. The photo-taking lens 11 corresponds to the photo-taking lens 250 shown in FIG. 4. The lens groups 12, 13 and 14 form the photo-taking lens 11. More specifically, the lens group 12 is a first lens group which is arranged to permit adjustment of focus position on the photo-taking image plane by moving it to the right and left on an optical axis. The lens group 13 is a second lens group which is arranged to permit the magnification on the photo-taking image plane to be variable by moving the lens group 13 to the right and left on the optical axis. The lens group 14 is a third lens group which is fixed. A diaphragm 15 corresponds to the diaphragm 213 shown in FIG. 3. A lens driving motor 16 (corresponding to the lens driving motor 211 shown in FIG. 3) is arranged to be caused by an automatic focusing action to move the first lens group 12 to the right or left, as viewed in FIG. 5, for automatic adjustment of focus position. A lens diaphragm driving motor (corresponding to the lens diaphragm driving motor 212 shown in FIG. 3) is arranged to open or stop down the diaphragm 15.

The external flash device 18 is mounted on the camera body 1 and is arranged to emit light according to a signal coming from the camera body 1. At the flash device 18, a xenon lamp 19 (corresponding to the xenon lamp 217 shown in FIG. 3) is arranged to convert an electric current energy into light emission energy. A reflection plate 20 and a Fresnel lens 21 are arranged to converge the light emission energy efficiently toward the object. Contacts 22 (corresponding to the flash-device control contact 113 shown in FIG. 3) are arranged as an interface between the camera body 1 and the external flash device 18.

Glass fiber 30, which corresponds to the glass fiber 219 shown in FIG. 3, is arranged to lead the light emitted from the xenon lamp 19 to a monitoring photodiode 31, which corresponds to the photodiode 220 shown in FIG. 3 and is provided for control over the amount of light for the main light emission of the flash device 18. The photodiode 31 is arranged to directly measure the amount of light for the preliminary light emission and that for the main light emission of the flash device 18. A photodiode 32, which corresponds to the photodiode 221 shown in FIG. 3, is arranged to monitor the light emitted from the xenon lamp 19. The flash device can be caused to make flat light emission by restricting a light emission current flowing to the xenon lamp 19 according to the output of the photodiode 32.

Figure 6:
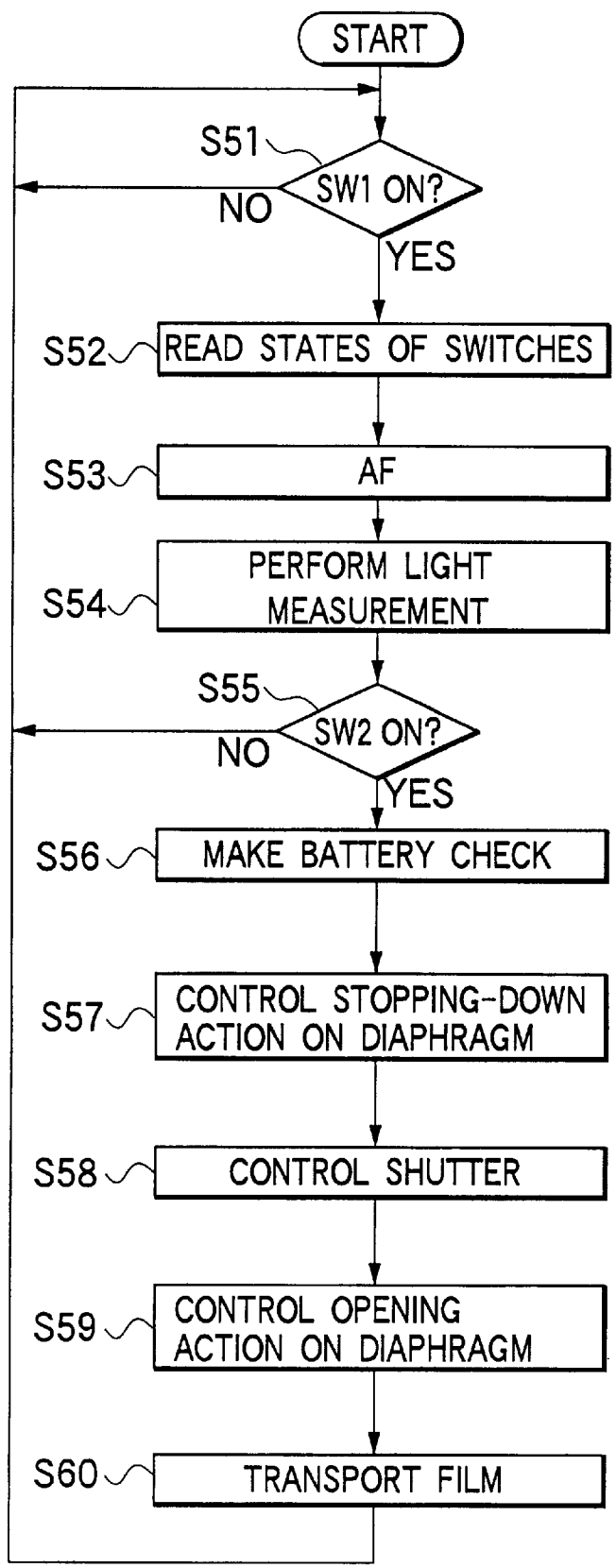
FIG. 6 is a flow chart showing a series of operations of the camera according to each embodiment of the invention.

FIG. 6 shows in a flow chart procedures for a series of operations to be performed by the camera according to the first embodiment of the invention.

At a step S51 of FIG. 6, a check is made by the MPU 100 to find if the switch SW1 has turned on. If not, the flow of operation waits until the switch SW1 turns on. If so, the flow proceeds from the step S51 to a step S52. At the step S52, the setting states of the switches are read. The flow of operation then shifts to a flow of procedures for executing a photographing mode selected by these switches. The following describes by way of example a case where a light measuring mode is selected from among a plurality of photographing modes.

In the first embodiment, the camera has a four selectable light measuring modes including an evaluative light measuring mode, an averaging light measuring mode, a spot light measuring mode and a partial light measuring mode, as shown in FIG. 8. In the evaluative light measuring mode, a most apposite measured light value is always obtained as a measured light value from a luminance distribution on the photo-taking image plane on the basis of outputs of divided light measuring areas. In the averaging light measuring mode, the average of outputs of divided light measuring sensors is obtained as a measured light value. In the spot light measuring mode, a measured light value is obtained by measuring the luminance of a minute part measuring only several percent of the image plane, i.e., one of the divided light measuring areas 404 arranged as shown in FIGS. 1(*a*) and 1(*b*). In the partial light measuring mode, a measured light value is obtained by measuring the luminance of a light measuring area which is wider than the area of the spot light measuring mode, i.e., a light measuring area composed of a plurality of the divided light measuring areas 404 shown in FIGS. 1(*a*) and 1(*b*).

The following description is given assuming that the spot light measuring mode in which the luminance of only a very small part, i.e., one of the divided light measuring areas 404, is measured is selected.

Figure 7:
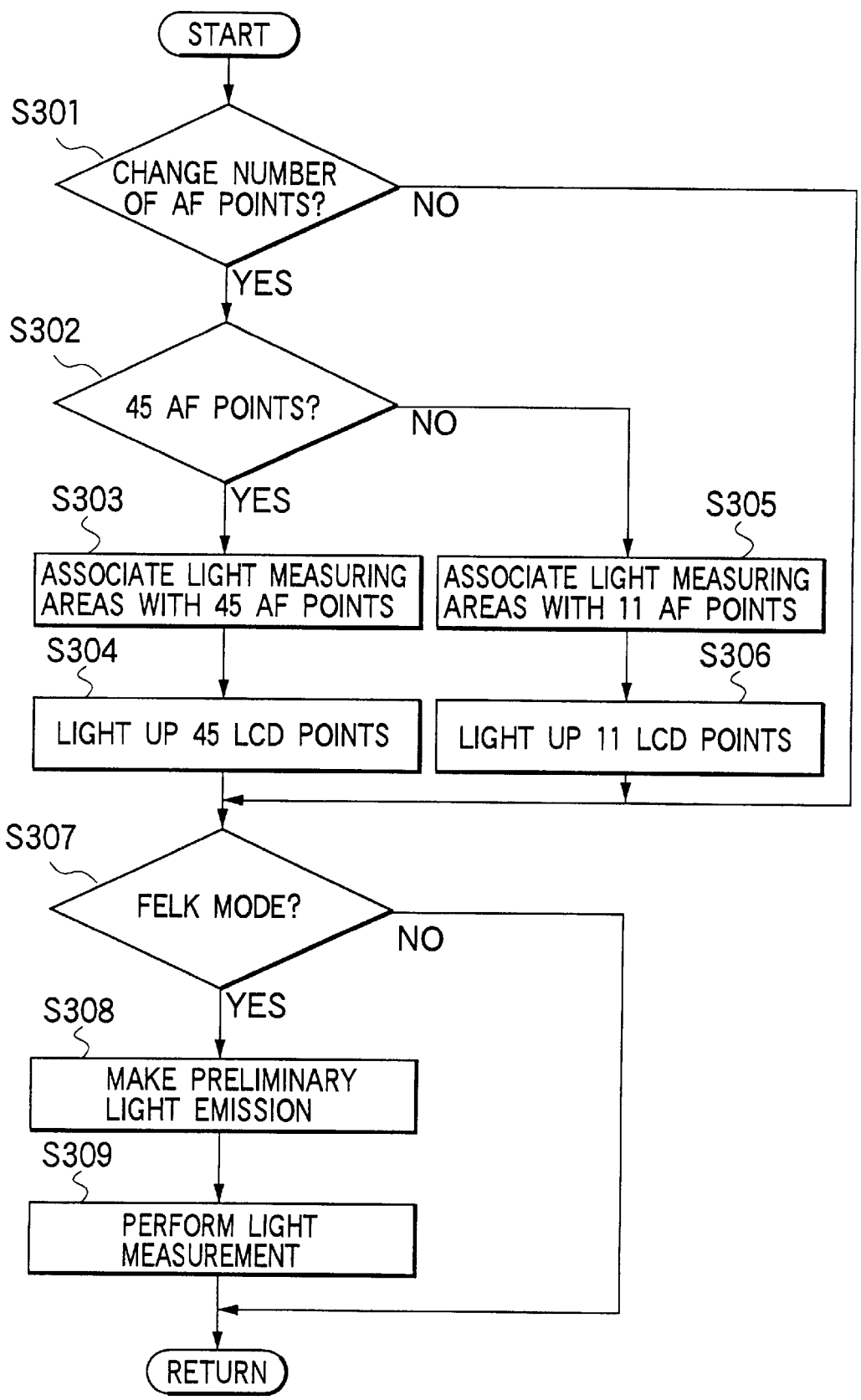
FIG. 7 is a flow chart showing a "spot-light-measurement association" subroutine of the camera according to the first embodiment of the invention.

At the step S52 of FIG. 6, the flow proceeds to a "spot light measurement association" subroutine for associating the spot light measurement with AF points, which is as shown in the flow chart of FIG. 7.

At a step S301 of FIG. 7, a check is made to find if the AF point selecting mode switch FP_SEL is operated to change the number of selectable AF points. If not, the flow proceeds immediately to a step S307 as there is no change in photo-taking conditions. If the number of selectable AF points is found to have been changed, the flow proceeds from the step S301 to a step S302. At the step S302, a check is made to find if the changed number of selectable AF points is 45 points. If so, the flow proceeds to a step S303. If not, the flow proceeds to a step S305.

At the step S303, the MPU 100 executes a process for associating the light measuring areas with the 45 AF points. In other words, all the divided light measuring areas shown in grey in FIG. 1(*a*) are set to be selectable for measuring light. At the next step S304, the MPU 100 causes the liquid crystal display circuit 109 and the intra-viewfinder LCD 208 to light up within the viewfinder the LCD points for all the 45 AF points, to let the user know that any one of the 45 divided light measuring areas is selectable, as shown in black in FIG. 1(*a*). In an actual operation, when the user selects one of the 45 AF points lighted up, one of the divided light measuring areas correlated to the selected AF point is selected as a spot light measuring area.

If the number of selectable AF points is 11 points instead of 45 points, the flow proceeds from the step S302 to a step S305. At the step S305, the MPU 100 executes a process for associating the light measuring areas with the 11 AF points. In other words, all the divided light measuring areas indicated in gray in FIG. 1(*b*) are set to be selectable as light measuring areas. At the next step S306, the MPU 100 causes the liquid crystal display circuit 109 and the intra-viewfinder LCD 208 to light up within the viewfinder the LCD points for all the 11 AF points, to let the user know that any one of the 11 divided light measuring areas is selectable, as shown in black in FIG. 1(*b*). In an actual operation, when the user selects one of the 11 AF points lighted up, one of the divided light measuring areas correlated to the selected AF point is selected as a spot light measuring area.

After the step S304 or S306, the flow proceeds to a step S307. At the step S307, a check is made to find if the FELK mode is set. As mentioned in the foregoing, the FELK mode can be set by pushing the AE lock button 256 with the flash device mounted on the camera body. If the FELK mode is found to have been set, the flow proceeds to a step S308. If not, this subroutine immediately comes to an end. At the step S308, preliminary light emission is made. At a step S309, a light measuring action (for light control) is performed while the preliminary light emission is made. The data of measured light thus obtained is stored in the RAM 10*a* disposed within the MPU 100 to be used at the time of the main light emission. This subroutine then comes to an end.

At the step S52 of FIG. 6, after the above-stated subroutine, the user who sees either the display of FIG. 1(*a*) or that of FIG. 1(*b*) performs an operation to select one of the 45 or 11 AF points as desired. The MPU 100 then stores, in its RAM 100*a*, information on the selected AF point and the divided light measuring area correlated to the selected AF point. The details of this process are not shown in the flow chart.

At a step S53 of FIG. 6, information on focus for the AF point selected from among the 45 or 11 AF points is obtained from the focus detecting circuit 102. Then, the lens control circuit 112 and the lens driving motor 211 are driven to adjust the focus position of the photo-taking lens 11. At the next step S54, information on the measured light of the divided light measuring area which corresponds to the selected AF point is obtained from the light measuring circuit 103. A shutter speed and an aperture value are decided according to the information on the measured light.

At a step S55, a check is made to find if the switch SW2 is in its on-state. If not, the flow returns to the step S51. If so, the flow proceeds from the step S55 to a step S56. At the step S56, a battery check is made to find if a power source battery has a capacity sufficient for carrying out a photo-taking operation by spuriously applying a load to a predetermined actuator. If not, the series of actions comes to an end by giving some warning or the like although that process is not shown in the flow chart. If the battery is found to have a sufficient capacity, the flow proceeds from the step S56 to a step S57.

At the step S57, to carry out a (shutter) release action, the lens control circuit 112 and the lens diaphragm driving motor 212 are caused to stop down the diaphragm 213 to its position of an aperture value decided at the step S54. At a step S58, a shutter opening-and-closing operation (for an exposure) is controlled by controlling the shutter control circuit 104, etc., on the basis of the shutter time (speed) decided at the step S54. In this instance, the flash device 18 is used if necessary. At a step S59, the diaphragm 213 is brought back to its full open aperture position. At a step S60, a photographic film winding action is performed by controlling the motor control 106, the film travel detecting circuit 107, etc. The flow then returns to the step S51.

A sequence of actions thus comes to an end.

The first embodiment has been described above as being arranged to have the AF points coinciding in position with the divided light measuring areas. In the case of a camera which is arranged according to a second embodiment of the invention, on the other hand, the AF points do not coincide with divided light measuring areas in number and shape. The mechanical and electrical arrangements of the camera in the second embodiment are identical with those of the first embodiment and are, therefore, omitted from the following description.

FIG. 9(*a*) shows 45 AF points 411 appearing on the visual field of a viewfinder in the second embodiment. FIG. 9(*b*) shows divided light measuring areas 412 in the second embodiment. The divided light measuring areas 412 include a plurality of areas having different shapes. The shapes of the divided light measuring areas 412 not only differ from the shape of the AF points 411 but also are larger than the size of the AF points 411. The light measuring areas 412 can be grouped by shapes, including four divided light measuring areas 412a, two divided light measuring areas 412b, two divided light measuring areas 412c, two divided light measuring areas 412d, four divided light measuring areas 412e and seven divided light measuring areas 412f. Of these light measuring area groups, a total of 15 areas of the groups 412c to 412f are arranged to permit spot light measurement.

As is apparent from comparison between FIGS. 9(a) and 9(b), the number and shape of AF points does not coincide with those of the divided light measuring areas. In carrying out a spot light measuring action or an FELK action, therefore, a manner whereby the number of light measuring areas selectable according to the number of selectable AF points is to be changed differs from the manner of the first embodiment. The difference in this respect is next described as follows.

The photo-taking actions of the camera to be performed when the spot light measuring mode is selected are described with reference to FIG. 10 as follows. The basic actions of the second embodiment are similar to those of the first embodiment. Therefore, FIG. 10, which is a flow chart, shows only a "spot light measurement association" subroutine for processes of associating the spot light measuring areas with the AF points, which is performed at the step S52 of FIG. 6.

Figure 10:
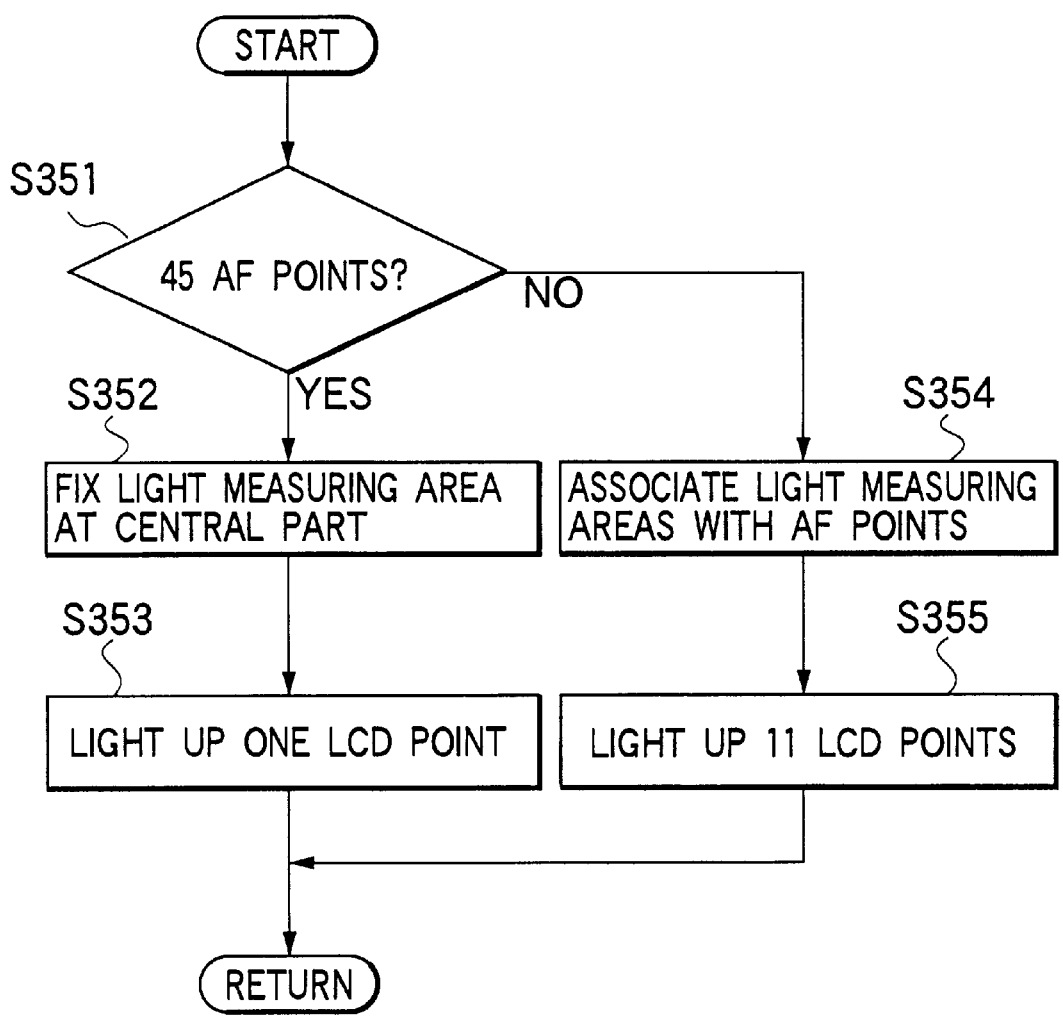
FIG. 10 is a flow chart showing a "spot-light-measurement association" subroutine of the camera according to the second embodiment of the invention.

At a step S351 of FIG. 10, a check is made for the position of the AF point selecting mode switch FP_SEL to find if the currently set number of selectable AF points is 45 points. If so, the flow proceeds to a step S352. At the step S352, the MPU 100 fixes a central area of the divided light measuring areas as a selectable light measuring area, because of the following reason. It has been ascertained by experience that a main object is most likely located at a central part of an ordinary photo-taking scene. Besides, an index indicating an AF point is generally formed only at a central part of an image plane. Therefore, the arrangement for setting a selectable divided light measuring area at this position facilitates camera operations for the unexperienced user.

Figure 11A:
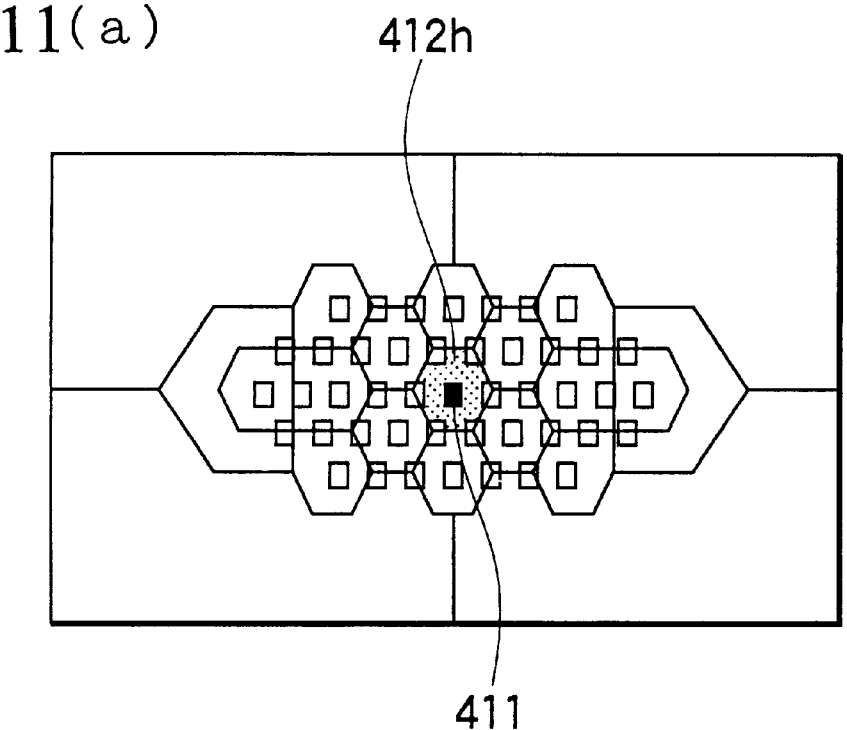
FIGS. 11(a) and 11(b) are diagrams showing a correlation of the number of selectable AF points to divided light measuring areas obtained in the second embodiment.

At the next step S353, to let the user know that the selectable divided light measuring area has been fixed to the central part of the image plane, the MPU 100 causes the liquid crystal display circuit 109 and the intra-viewfinder LCD 208 to light up only one LCD point that corresponds to the AF point located at the center of the image plane within the viewfinder. In this instance, the inside of the viewfinder is in a state as shown in FIG. 11(a). In this state, only one divided light measuring area 412h is lighted up among the divided light measuring areas 412f, as shown in black in FIG. 11(a).

Figure 11B:
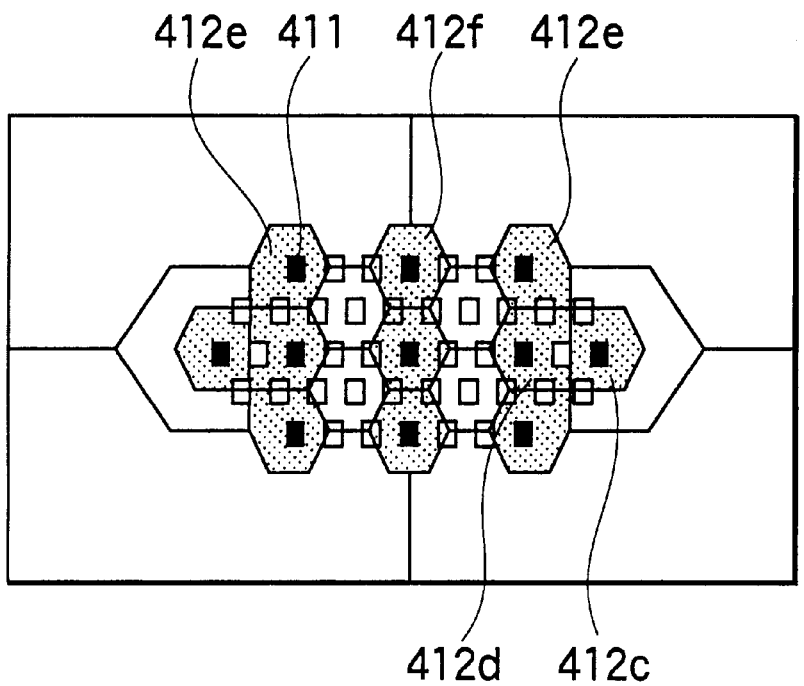

Further, if the number of selectable AF points currently set by the AF point selecting mode switch FP-SEL is found at the step S351 to be not 45 points, i.e., if it is found to be 11 points, the flow proceeds from the step S351 to a step S354. At the step S354, the MPU 100 decides selectable light measuring areas to be such divided light measuring areas that can be correlated (associated) with the AF points among the divided light measuring areas. At the next step S355, to let the user know that the selectable divided light measuring areas are associated with the selectable AF points, the MPU 100 causes the liquid crystal display circuit 109 and the inter-viewfinder LCD 208 to light up all the LCD points corresponding to the 11 AF points within the viewfinder. A state obtained inside of the viewfinder in that instance is as shown in FIG. 11(b). Then, all parts corresponding to divided light measuring areas 412c to 412e and three of seven divided light measuring areas 412f are lighted up as shown in black in FIG. 11(b).

In the case of FIG. 11(b), since the divided light measuring areas differ in shape and number from the AF points, a plurality of AF points are correlated with one and the same divided light measuring area depending on the allocation of these areas, that is, some of divided light measuring areas include only a part of one AF point therein. However, the shapes and allocations of the divided light measuring areas are prearranged to have each of the 11 selectable AF points completely within one divided light measuring area in a case where 11 AF points are selected.

Each of the first and second embodiments of the invention is arranged as described above to vary the selectable divided light measuring areas according to the number of selectable AF points. A camera according to a third embodiment of the invention is, on the other hand, arranged to vary the light measuring mode when the number of selectable AF points varies.

The third embodiment is described below while omitting all parts that are the same as the corresponding parts of the first and second embodiments.

The allocation of the AF points and that of the divided light measuring areas in the third embodiment are the same as those of the first embodiment. However, the third embodiment differs from the first embodiment in that the light measuring mode varies according to the number of selectable AF points.

Figure 12A:
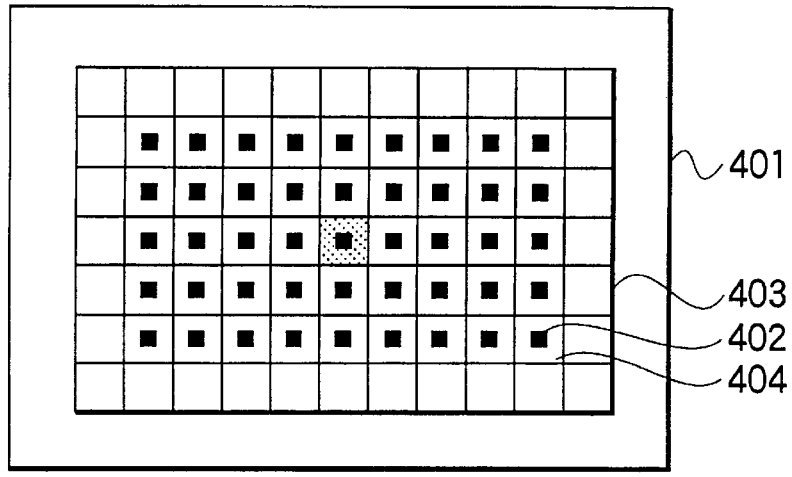
FIGS. 12(a), 12(b) and 12(c) are diagrams showing a correlation of the number of selectable AF points to divided light measuring areas in a camera according to a third embodiment of the invention.
Figure 12B:
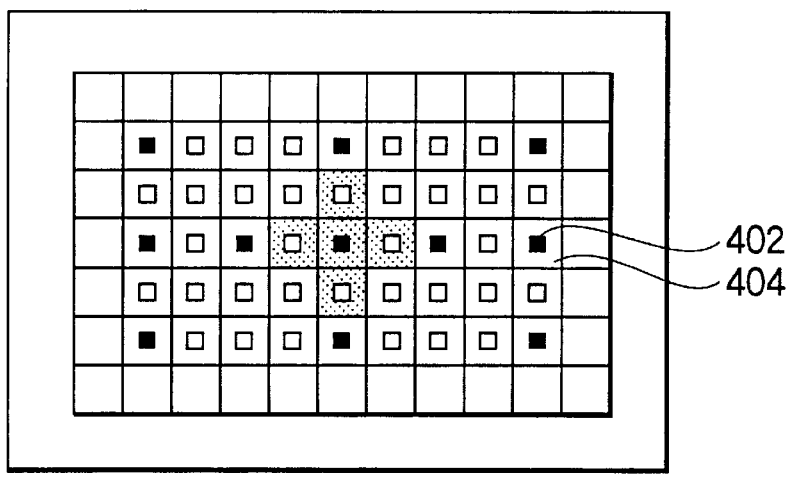
Figure 12C:
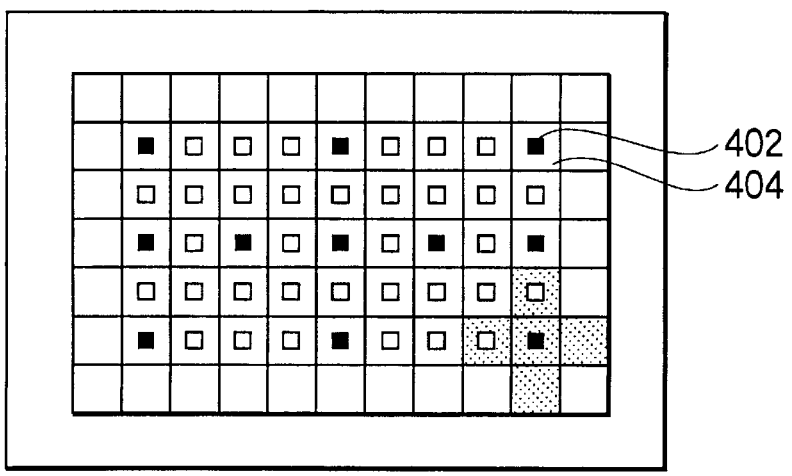

FIGS. 12(a) to 12(c) show the relation of the divided light measuring areas to the AF points in the third embodiment. FIG. 12(a) shows a case where 45 points are set as selectable AF points 402. FIGS. 12(b) and 12(c) respectively show cases where 11 points are set as selectable AF points 402.

With 45 points set as selectable AF points, 45 divided light measuring areas 404 which correspond to these AF points among others are selectable. If an AF point located in the central part of the image plane is finally selected by the user, one light measuring area (part shown in gray) correlated to the central AF point is automatically selected from among others by the MPU 100 to obtain information on the measured light value of this divided light measuring area. In other words, a spot light measuring action is performed in this instance.

In a case where 11 points are set as selectable AF points, it might be possible to obtain measured light information more accurately by including not only one divided light measuring area correlated to a finally selected AF point but also some other divided light measuring areas located adjacent to the correlated area. In view of such possibility, the MPU 100 automatically selects a total of five divided light measuring areas (parts shown in gray), including not only the light measuring area correlated to the finally selected AF point but also four other light measuring areas located around it, as shown in FIG. 12(b) or 12(c). In other words, in the case of the FIGS. 12(b) or 12(c), a partial light measuring action is performed to obtain measured light information from the five of the divided light measuring areas.

Figure 13:
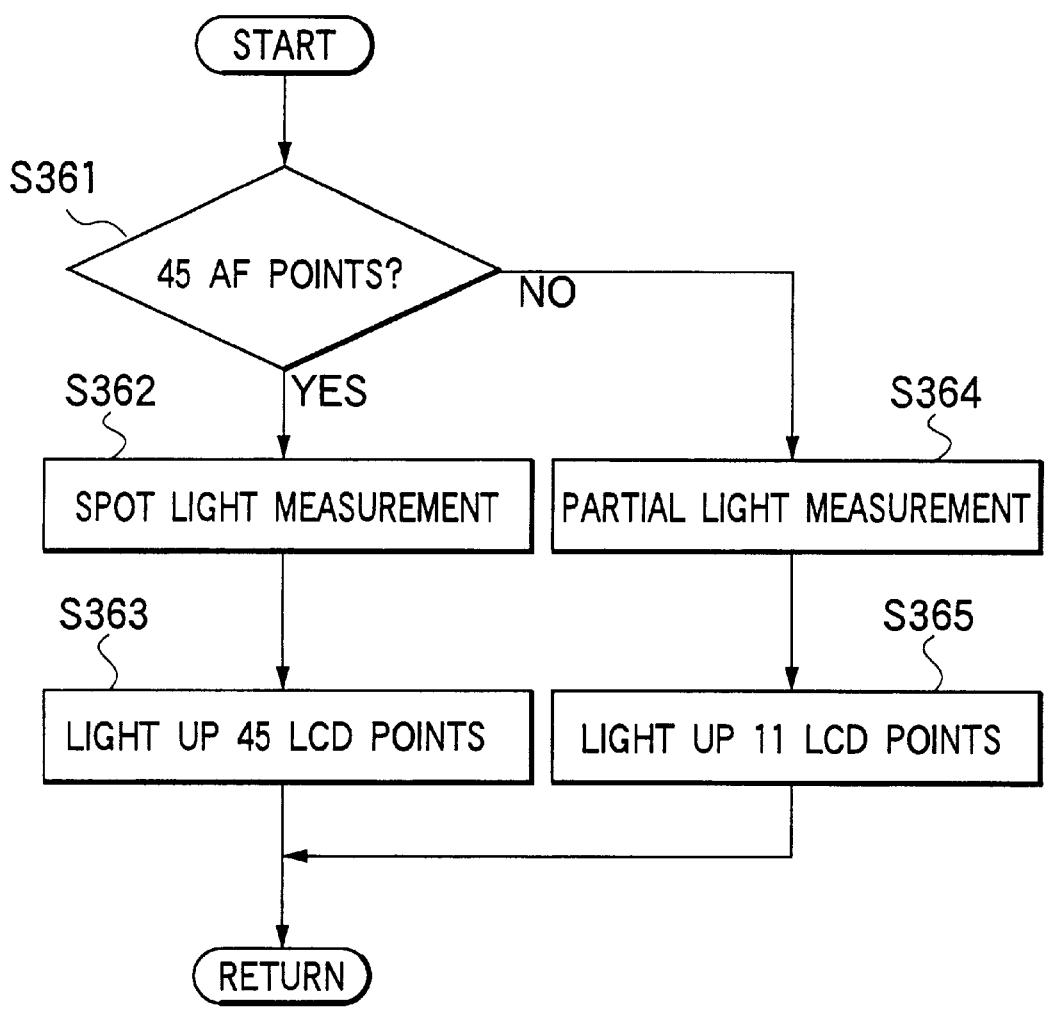
FIG. 13 is a flow chart showing processes to be performed in the third embodiment for varying selectable AF points and the light measuring mode.

In varying the light measuring mode according to the number of selectable AF points, the third embodiment operates as shown in FIG. 13, which is a flow chart. The basic actions of the third embodiment are omitted from the following description as they are the same as those of the first embodiment described in the foregoing.

At a step S361 of FIG. 13, a check is made to find if the currently set number of selectable AF points is 45 points. If so, the flow proceeds to a step S362. At the step S362, when one arbitrary AF point is finally selected by the user, the MPU 100 executes a process for carrying out a spot light measuring action on a divided light measuring area correlated to the selected AF point, i.e., for setting the mode of the camera into the spot light measuring mode (see FIG. 12(a)). At a step S363, to let the user know that any of 45 divided light measuring areas is selectable, the MPU 100 causes the liquid crystal display circuit 109 and the intra-viewfinder LCD 208 to light up all of 45 LCD points within the viewfinder, as shown in black in FIG. 12(a).

If the number of selectable AF points is found to be 11 points, the flow proceeds from the step S361 to a step S364. At the step S364, when one arbitrary AF point is finally selected by the user, the MPU 100 executes a process for carrying out a partial light measuring action not only on a divided light measuring area correlated to the selected AF point but also on divided light measuring areas around the correlated area, i.e., for setting the mode of the camera into the partial light measuring mode (see FIG. 12(b) or 12(c)). Then, the flow proceeds from the step S364 to a step S365. At the step S365, to let the user know that any of the 11 divided light measuring areas is selectable, the MPU 100 causes the liquid crystal display circuit 109 and the intra-viewfinder LCD 208 to light up 11 LCD points within the viewfinder, as shown in black in FIG. 12(b) or 12(c).

The third embodiment differs from the first embodiment also in the following point. In the case of the third embodiment, at the step S54 of FIG. 6, a shutter time value and an aperture value are decided according to information on measured light by obtaining the measured light information in the light measuring mode set at the step S362 or S364.

The first and second embodiments are arranged, as described above, to vary the selectable divided light measuring areas according to the number of selectable AF points. This arrangement effectively saves the user from being forced to take the a trouble of selecting a divided light measuring area after selecting a selectable AF point. The divided light measuring areas are automatically changed to optimum divided light measuring areas in association with a number-of-AF point setting operations as described in the foregoing (for example, in such a way as to automatically inhibit the use of applicable divided light measuring areas in a case where some distance measuring areas are inhibited from being used). That arrangement improves operability of the camera to enable even an unexperienced user to take a picture with an adequate exposure.

The third embodiment is arranged to select an optimum light measuring mode from among a plurality of light measuring modes according to the number of selectable AF points in association with the final selection of one of the selectable AF points. This enables even a beginner to take adequate pictures without fail.

In the case of each of the embodiments described above, the invention is applied, by way of example, to a single-lens reflex camera. However, the invention is applicable to cameras of varied kinds, such as a lens-shutter type camera, an electronic still camera, etc.

The focus detecting areas are described as AF points (AF areas) in the foregoing. However, in a case where the invention is applied to a lens-shutter type camera, for example, distance measuring points (areas) to be used for detecting a distance to an object to be photographed correspond to the focus adjusting areas.

What is claimed is:

1. A camera comprising:
   a) focus detecting means capable of performing a focus detecting operation on each of a plurality of focusing areas;
   b) light measuring means capable of performing a light measuring operation on each of a plurality of light measuring areas;
   c) setting means for setting selectable focusing areas to be selectable from among the plurality of focusing areas; and
   d) varying means for varying selectable light measuring areas according to the selectable focusing areas set by said setting means.

2. A camera according to claim 1, wherein at least a part of the plurality of light measuring areas are allocated to overlap at least a part of the plurality of focusing areas.

3. A camera according to claim 1, wherein the total number of the plurality of light measuring areas is larger than that of the plurality of focusing areas.

4. A camera according to claim 1, wherein the total number of the plurality of focusing areas is larger than that of the plurality of light measuring areas.

5. A camera according to claim 1, wherein the area of each of the plurality of focusing areas is smaller than the area of each of the plurality of light measuring areas.

6. A camera according to claim 1, wherein said setting means sets number of selectable focusing areas to be selectable from among the plurality of focusing areas, and said varying means varies selectable light measuring areas according to the number of the selectable focusing areas set by said setting means.

7. A camera according to claim 6, wherein said varying means varies the selectable light measuring areas in a case where the number of selectable focusing areas set by said setting means exceeds the total number of the plurality of light measuring areas.

8. A camera according to claim 6, wherein said varying means varies the selectable light measuring areas to a predetermined specific light measuring area in a case where the number of selectable focusing areas set by said setting means exceeds the total number of the plurality of light measuring areas.

9. A camera according to claim 1, wherein said setting means sets number of selectable focusing areas to be selectable from among the plurality of focusing areas, and said varying means varies number of selectable light measuring areas according to the number of the selectable focusing areas set by said setting means.

10. A camera comprising:
    a) focus detecting means capable of performing a focus detecting operation on each of a plurality of focusing areas;
    b) light measuring means capable of performing a light measuring operation on each of a plurality of light measuring areas, at least a part of the plurality of light measuring areas being allocated to overlap at least a part of the plurality of focusing areas;
    c) first setting means for setting selectable focusing areas to be selectable from among the plurality of focusing areas; and
    d) second setting means for setting, as selectable light measuring areas, only the light measuring areas that are allocated among the plurality of light measuring areas in positions overlapping the selectable focusing areas set by said first setting means.

11. A camera according to claim 10, wherein the total number of the plurality of light measuring areas is larger than that of the plurality of focusing areas.

12. A camera according to claim 10, wherein the total number of the plurality of focusing areas is larger than that of the plurality of light measuring areas.

13. A camera according to claim 10, wherein the area of each of the plurality of focusing areas is smaller than the area of each of the plurality of light measuring areas.

14. A camera comprising:
   a) focus detecting means capable of performing a focus detecting operation on each of a plurality of focusing areas;
   b) light measuring means having a plurality of light measuring areas and capable of performing a light measuring operation in one of a plurality of light measuring modes;
   c) first setting means for setting number of selectable focusing areas to be selectable from among the plurality of focusing areas; and
   d) second setting means for setting the light measuring mode of said light measuring means according to the number of selectable focusing areas set by said first setting means.

15. A camera according to claim 14, wherein said light measuring means has a first light measuring mode in which a light measuring operation is performed only on a light measuring area allocated in a position overlapping a selectable focusing area and a second light measuring mode in which a light measuring operation is performed not only on a specific light measuring area allocated in a position overlapping a selectable focusing area but also on light measuring areas allocated around said specific light measuring area.

16. A camera according to claim 15, wherein said light measuring means is set to said second light measuring mode in a case where the number of selectable focusing areas is less than the total number of the plurality of focusing areas.

17. A camera according to claim 15, wherein said light measuring means is set to said first light measuring mode in a case where the number of selectable focusing areas is equal to the total number of the plurality of focusing areas.

* * * * *

UNITED STATES PATENT AND TRADEMARK OFFICE
CERTIFICATE OF CORRECTION

PATENT NO. : 6,163,652
DATED : December 19, 2000
INVENTOR(S) : Yoichi Sato

It is certified that error appears in the above-identified patent and that said Letters Patent is hereby corrected as shown below:

Column 3,
Line 43, delete "stakes" and insert -- states --.

Column 8,
Line 6, delete "10 a" and insert -- 100a --.

Signed and Sealed this

First Day of January, 2002

Attest:

*Attesting Officer*

JAMES E. ROGAN
*Director of the United States Patent and Trademark Office*